United States Patent [19]

Anderson et al.

[11] 4,084,748
[45] Apr. 18, 1978

[54] SPRAY SENSING SYSTEM

[75] Inventors: Jack William Anderson, Rte. 1, East Berlin, Pa. 17316; Glenn Hughes, Dillsburg, Pa.

[73] Assignee: Jack W. Anderson

[21] Appl. No.: 756,732

[22] Filed: Jan. 4, 1977

[51] Int. Cl.² .............................................. B05B 17/00
[52] U.S. Cl. ....................................................... 239/74
[58] Field of Search .................................. 239/71–74; 222/23, 40; 116/117 R; 200/61.05; 340/239 S

[56] References Cited

U.S. PATENT DOCUMENTS

| 3,355,102 | 11/1967 | Gregory, Jr. | 222/23 X |
| 3,493,951 | 2/1970 | Hartka et al. | 340/239 |
| 4,023,507 | 5/1977 | van der Lely | 239/71 X |

FOREIGN PATENT DOCUMENTS

| 744,798 | 1/1944 | Germany | 222/23 |

Primary Examiner—John J. Love
Attorney, Agent, or Firm—Schuyler, Birch, Swindler, McKie & Beckett

[57] ABSTRACT

A system for sensing the flow of an electrically conductive liquid through a nozzle. The nozzle represents one side of an electrical sensing circuit. A conductive probe is positioned near the nozzle, so that it extends into the spray. The probe represents the second side of the electrical sensing circuit. The probe is mounted on a clamp positioned on the inside of a protective enclosure. The probe is the bottom of the enclosure. When liquid sprays from the nozzle, the sensing circuit is closed. A switch responds to this by illuminating an indicator lamp. If the liquid flow ceases, the signal circuit is opened, and the switch signals this occurrence. The switch is a transistor that operates a light emitting diode.

11 Claims, 3 Drawing Figures

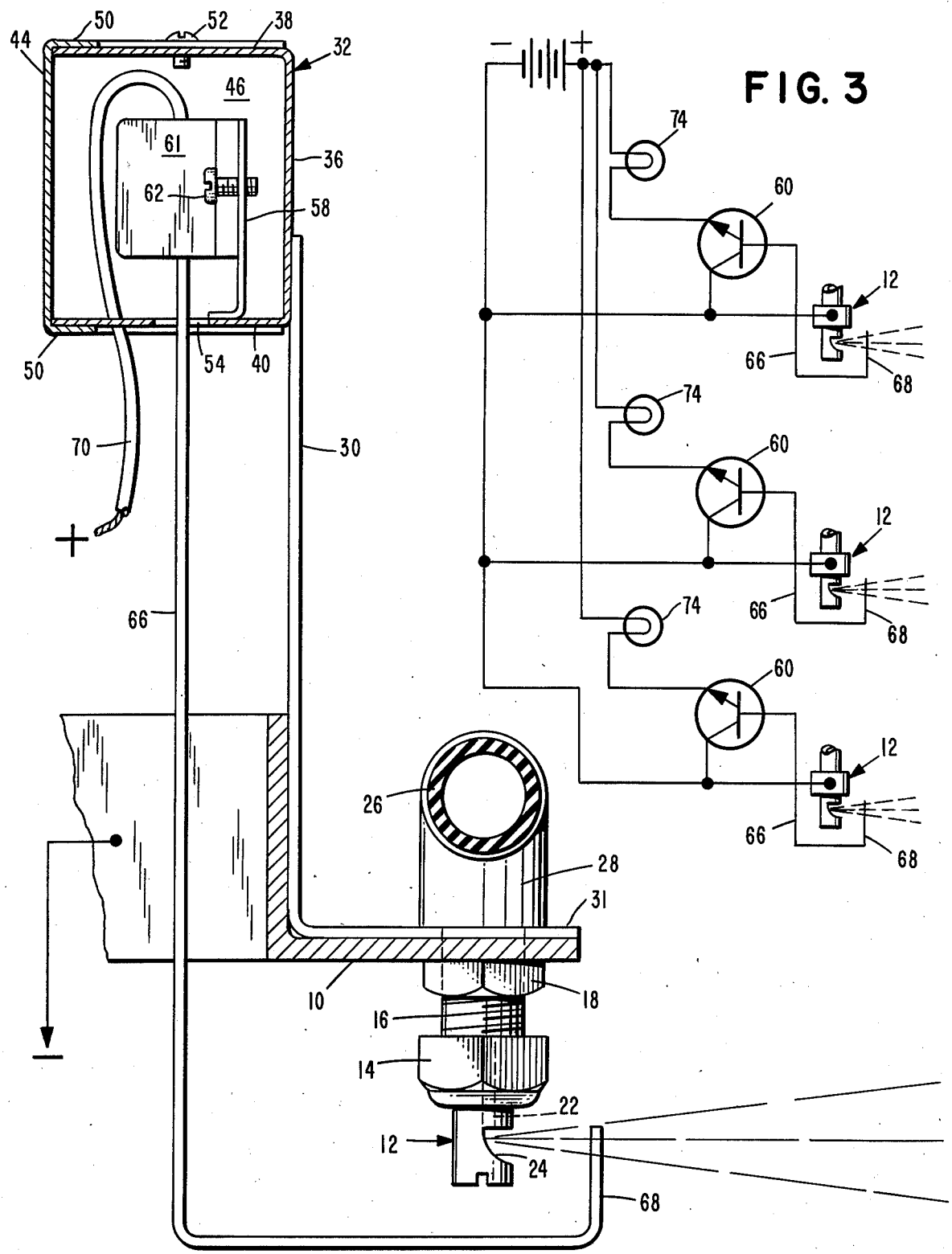

SPRAY SENSING SYSTEM

BACKGROUND OF THE INVENTION

This invention relates generally to the field of spraying devices, and more particularly to a sensing device for use with moving sprayers such as those used to apply liquid to powdered fertilizers, insecticides, herbicides, and the like. In this type of equipment, one or more spray nozzles is mounted on a truck or tractor, or a trailer pulled thereby, and the liquid or powder is applied over a relatively large area during each pass. It is important to know immediately if one or more of the nozzles has ceased operating. Otherwise, large areas will not be treated. It is often very difficult to determine whether a portion of a field has not been sprayed by visual observation after the task is completed. Therefore, it is very important that the operator of the vehicle know immediately when a nozzle ceases to spray.

In prior art systems, an operator continuously monitored the spray application by sight. This has several disadvantages. If the vehicle operator must continuously watch the sprayers, the safe operation of the vehicle is impeded. If a second person must be brought along for this task, the cost of the operation is increased. In some vehicles the sprayer nozzles are not easily seen from the driving position, and thus the operator cannot easily determine whether a spray nozzle has ceased to operate. Also, under many conditions, the movement of the vehicle causes considerable turbulance to be present in the vicinity of the spray nozzles, and it is difficult to determine which are spraying and which, if any, are not.

The prior art contains many systems for sensing the flow of a liquid. For some reason, these appear not to have been used in agricultural sprayers. The reasons for this probably include the expense of such an installation, and an inability to perform properly under the extremely rugged conditions of shock, vibration and contamination that are presented by agricultural apparatus. Furthermore, in this type of equipment, the sprayed material tends to become turbulent and coat the components of the device. An electrical sensing system operating in this environment must be able to withstand continuous abuse and must be designed to operate in a situation wherein the components are covered with the electrically conductive sprayed material, which can adversely affect the sensing system, causing it falsely to indicate always that spray is issuing from the nozzles. In any event, the many problems of this field have apparently not been overcome, for there appear to be no such sensing systems currently available.

SUMMARY OF THE INVENTION

This invention is to be used with spray materials that are sufficiently electrically conductive to operate with the below described electrical circuitry. The spray material can be liquid or solid, or a combination, and reference to "fluid" or "spray material" herein is to be interpreted in a broad sense.

The object of this invention is to provide a sensing system for indicating the cessation of flow from a spray nozzle.

Another object of this invention is to provide a sensing system of the type described that operates effectively on mobile agricultural sprayers and the like.

A further object of this invention is to provide a sensing system of the type described that is easily installed on a vehicle.

Still another object is to provide an improved electrical sensing circuit.

Basically, the invention comprises an electrical circuit having two interrelated portions. A sensing portion senses the absence or presence of the spray issuing from the nozzle by using the electrically conductive spray itself to complete the circuit. A signal portion obtains an input (or lack of input) from sensing portion and operates a signal device such as a lamp or horn. The liquid or powder spray must be sufficiently conductive, as is the usual case with agricultural fertilizers, herbicides, insecticides and the like.

The sensing portion utilizes a conductive nozzle and a conductive probe spaced from the nozzle in the path of the spray. When the spray is issuing from the nozzle it electrically connects the nozzle and the probe, thus closing the sensing circuit and indicating an operating condition to the signal circuit. In order to eliminate electrical problems caused by the presence of a film of conductive spray material on the apparatus, the probe mount is positioned in a closed box-like enclosure, from the bottom of which the probe extends through an opening. The probe and its mount are isolated electrically from the frame of the apparatus, and from the other side of the sensing circuit.

The electrical circuitry itself also forms a distinct part of this invention, although it also has applications outside of the field of agricultural sprayers. A transistor switch forms the juncture between a sensing circuit portion and a signal circuit portion of the total circuit. The transistor switch controls the lighting of the signal lamp and/or the operation of an audible alarm, in response the the presence or absence of a closed sensing circuit. The spray nozzle and the collector of the transistor switch are both connected to ground. In normal operation, when the conductive spray electrically connects the nozzle and the probe, the emitter-base junction of the transistor is turned on, and the voltage drop is effective across the lamp, which is a light emitting diode. Thus the lamp is lighted. If the spray stops, base current ceases to flow in the transistor, and it is turned off. In this situation, the voltage drop occurs across the transistor, and insufficient voltage is available to operate the lamp. Thus, the lamp is turned off. This condition can also be used to operate an audible alarm.

BRIEF DESCRIPTION OF THE DRAWINGS

FIG. 2 is a side view, partially in section, of a single nozzle sensing unit constructed in accordance with this invention, taken along line 2—2 of FIG. 1.

FIG. 3 is a schematic representation of the electrical circuit used in this invention.

DESCRIPTION OF A PREFERRED EMBODIMENT

Figure 1:
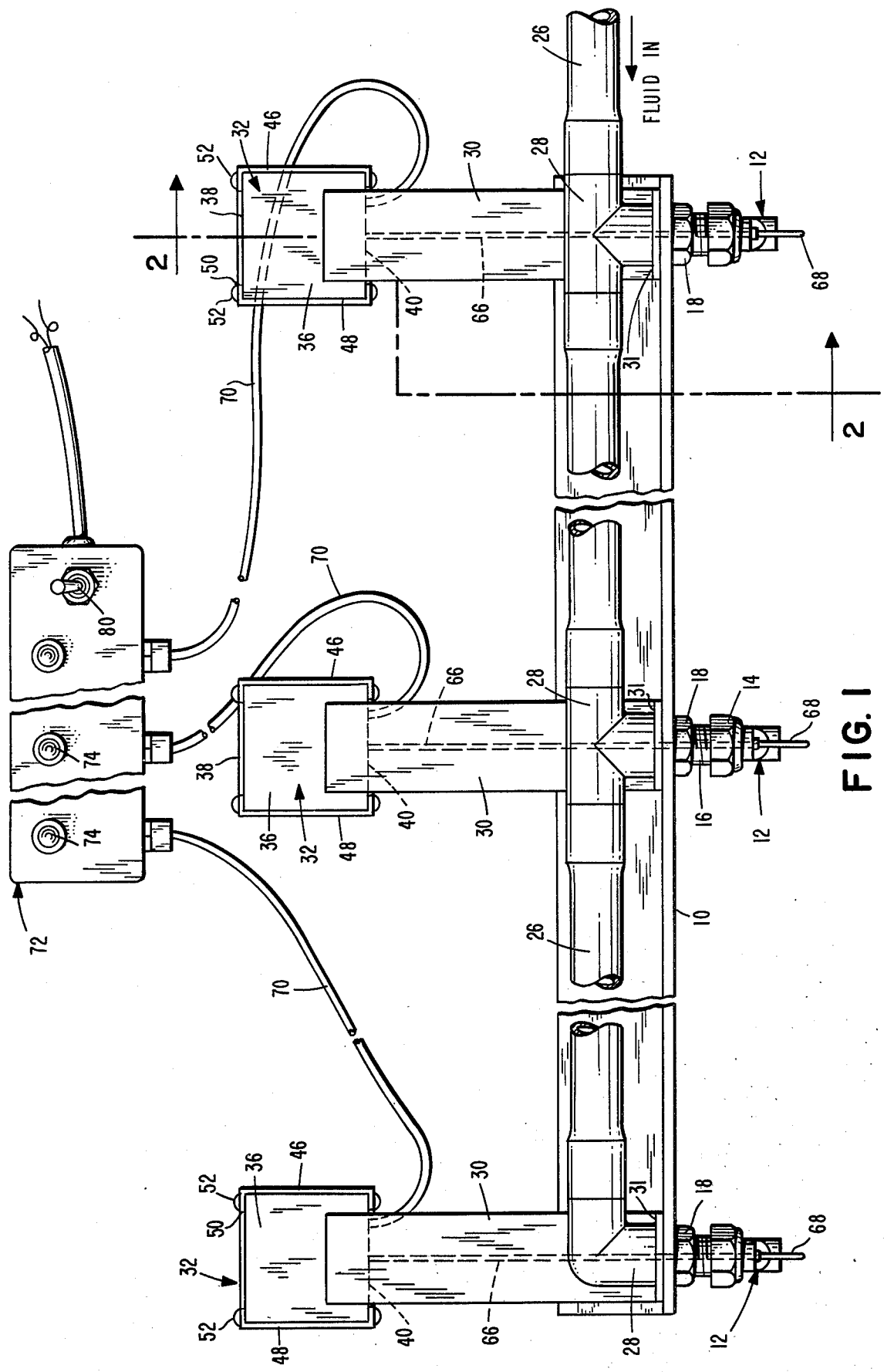
FIG. 1 is a nozzle assembly constructed in accordance with this invention.

The invention is described herein in terms of an apparatus for spraying liquid, but this is by way of example only.

Looking to FIG. 1, a typical nozzle assembly consists of a mounting bar 10 that is attached to a vehicle or cart frame, or the like, not shown. A plurality of spray nozzles 12 are attached by connector nuts 14 to fittings 16, located at spaced intervals along bar 10. A nut 18 clamps each nozzle assembly to bar 10. Each nozzle has a central bore terminating in a spray opening or discharge passage 22, adjacent to a deflector 24. Usually, the nozzles 12 are so oriented as to spray rearwardly of the apparatus. The nozzles shown are merely examples. Virtually any of the well-known types can be used.

A fluid supply pipe 26 supplies the material to be sprayed to nozzles 12 via a plurality of fittings 28 which can be T's or L's, depending upon the location of the nozzles. Nozzles 12, as disclosed herein, are entirely of electrically conductive material such as metal, as is bar 10. This is so that one side of the sensing portion of the electrical circuit can be established therethrough, as will be explained below. However, it is necessary only that some portion of the nozzle that is in contact with the material being sprayed be electrically conductive, and that this be connected to the other elements in such a way as to construct an electrical path, as will be described. The vehicle frame can be used as the ground side of the circuit, in which case nozzle 12 is in electrical communication with bar 10, which in turn is electrically linked to the frame. Supply pipe 26 need not be electrically conductive, and is typically of plastic.

An L-shaped mounting member 30 is provided with an opening in its base 31 and is attached to bar 10 at each nozzle location, in this case being interposed between fittings 28 and the base flange of bar 10. Attached to member 30 are components forming an enclosure 32, which as disclosed comprises a C-shaped fixed member having a back 36, a top 38, and a bottom 40, and a C-shaped removable member having a front 44, a pair of sides 46 and 48, and flanges 50 to which it is attached to the fixed member by screws 52. Bottom 40 is provided with an opening 54. An upstanding plate 58 is attached to bottom 40, adjacent to opening 54. A probe mount 61 is attached to plate 58 by screws 62. Probe mount 61 is spaced from the sides of the enclosure, and is electrically insulated therefrom. Mount 30, enclosure 32, and plate 58 are shown as being made of metal, and thus would, as disclosed, be electrically connected to the ground side of the circuit via bar 10. However, this is not necessary. The mounting member 30 and enclosure 32 can be of non-conductive material.

A probe 66 is attached at one end to probe mount 61, and terminates at its free end in an upstanding portion 68 that is so located as to be within the envelope of the spraying material, spaced from nozzle 12 a particular distance calculated to foster electrical communication between the probe and the nozzle when the spray is operating. A wire 70 connects probe 66 electrical circuitry, described below, which is contained in box 72, and which operates a signal lamp 74 for each nozzle. Also provided is a system operating switch 80. Whether mounting member 30 and enclosure 32 are of electrically conductive material or not it is important that probe 66 and probe mount 61 be kept electrically isolated, and protected from the spray material that will be deposited on all of the components. Probe 66 extends through opening 54, which is located in the bottom of enclosure 32 so that little if any spray can enter enclosure 32. By the use of the structure shown, the possibility of the sensing portion of the circuit being falsely closed by the establishment of an alternate electrical path via spray material deposited on the components virtually is eliminated.

The electrical circuit is shown in FIG. 3 in conjunction with three spray devices 12 each having an indicator light 74 connected in parallel to a common voltage source. A transistor switch 60 is interposed between each spray device and the lamp and voltage source to control the lighting of the lamp to reflect whether or not the spray is functioning. The lamp is normally on if spray is flowing; it is off if the spray ceases to flow.

As can be seen, the circuit includes the series connection of the voltage source, the lamp 74 which is a light-emitting diode, the emitter base junction of the transistor, and the probe 66. The spray device itself, as well as the collector of the transistor are connected to ground. In normal operation, when the conductive spray forms an effectively conductive link between the spray device and the probe, the emitter-base junction of the transistor is turned on, and the voltage drop is effectively across the light-emitting diode, turning on the lamp. When the spray stops, base current ceases to flow and the transistor is turned off. The circuit now comprises the lamp in series with the high resistance between the collector and emitter of the transistor switch. Therefore, the voltage drop is now effectively across the transistor, and insufficient voltage appears across the light-emitting diode to turn on the lamp. Therefore, when the spray ceases, the lamp turns off.

Variations and modifications of the above described embodiment may become evident to one skilled in the art after a reading of this disclosure. However, the scope of the invention is to be defined only by the scope of the appended claims.

We claim:

1. A sensing system for indicating the cessation of flow of an electrically conductive fluid of the like issuing from a discharge passage means, comprising:
   an electrically conductive probe having a sensing portion positioned near said passage means in the path of the fluid spray issuing therefrom,
   probe mounting means for supporting said probe, said probe mounting means and said probe being electrically isolated from said passage means,
   enclosure means enclosing said probe mounting means sufficiently to preclude contact of said probe mounting means by fluid issuing from said passage means, said probe means extending outwardly of said enclosure means,
   electrically conductive means in electrical communication with fluid in said passage means,
   signal means for indicating the cessation of fluid issuing from said passage means,
   electrical power supply means,
   electrical switching means connectable to said probe, said electrically conductive means, said signal means and said power means, said switching means being responsive to the making and breaking of electrical communication between said probe and said electrical conductive means caused respectively by the flow and cessation of flow of fluid from said passage means into contact with said probe sensing portion to operate said signal means between a normal condition when fluid is issuing from said passage means and an alarm condition when fluid has substantially ceased to issue from said passage means.

2. The system of claim 1 wherein said electrically conductive means comprises at least a portion of said discharge passage means made of electrically conductive material.

3. The system of claim 2 wherein said sensing system and said discharge passage means are mounted on an electrically conductive frame that forms part of the electrical circuit.

4. The system of claim 1 wherein said discharge passage means is mounted on a support bar, and wherein said enclosure is mounted on a member attached to said bar, said probe mounting means being mounted inside of said enclosure and electrically insulated therefrom.

5. The system of claim 4 wherein said enclosure comprises a box-like structure having four sides, a top and a bottom, said bottom having an opening through which said probe extends without contacting said enclosure.

6. The system of claim 5 wherein said probe is generally J-shaped, and wherein said probe mounting means comprises an electrically non-conductive member mounted on a plate that is attached to the inside of said enclosure, the longer leg of said J-shaped probe being attached to said probe mounting means.

7. The system of claim 1 wherein said switching means comprises a transistor having a collector connected to the electrically conductive means, an emitter connected to the signal means, and a base connected to the probe, the power supply means being connected on the one hand to the collector and on the other hand to the signal means, so that when fluid spray issues from said nozzle means the voltage drop occurs across said signal means thus activating said signal means, and when said fluid spray ceases the voltage drop occurs across said transistor and said signal means is deactivated.

8. The system of claim 7 wherein said signal means comprises a light emitting diode.

9. The system of claim 1 comprising a plurality of discharge passage means and a plurality of said probes, said signal means, said switching means and said electrically conductive means.

10. The system of claim 8 comprising a plurality of said discharge passage means and a plurality of said probes, said light emitting diodes, said transistors and said electrically conductive means.

11. The system of claim 8 wherein said electrically conductive means comprises at least a portion of said discharge passage means, wherein said passage means is mounted on an electrically conductive frame and said electrically conductive portion and said collector are in electrical communication with said frame.

* * * * *

UNITED STATES PATENT AND TRADEMARK OFFICE
CERTIFICATE OF CORRECTION

PATENT NO. : 4,084,748
DATED : April 18, 1978
INVENTOR(S) : Jack William Anderson, et al It is certified that error appears in the above-identified patent and that said Letters Patent are hereby corrected as shown below:

In claim 1 at Column 4, line 31, change "of", second occurrence, to --or--.

Signed and Sealed this

Fifth Day of September 1978

[SEAL]

Attest:

RUTH C. MASON
*Attesting Officer*

DONALD W. BANNER
*Commissioner of Patents and Trademarks*